(12) United States Patent
Viger et al.

(10) Patent No.: US 11,051,303 B2
(45) Date of Patent: Jun. 29, 2021

(54) NON-CONTIGUOUS CHANNEL ALLOCATION OVER MULTI-CHANNEL WIRELESS NETWORKS

(71) Applicant: CANON KABUSHIKI KAISHA, Tokyo (JP)

(72) Inventors: Pascal Viger, Janze (FR); Stéphane Baron, Le Rheu (FR); Romain Guignard, Rennes (FR); Patrice Nezou, Saint-Sulpice la Foret (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/564,219

(22) Filed: Sep. 9, 2019

(65) Prior Publication Data

US 2020/0008200 A1 Jan. 2, 2020

Related U.S. Application Data

(63) Continuation of application No. 15/551,542, filed as application No. PCT/EP2016/053395 on Feb. 17, 2016, now Pat. No. 10,448,398.

(30) Foreign Application Priority Data

Feb. 19, 2015 (GB) .................................... 1502793

(51) Int. Cl.
*H04W 72/04* (2009.01)
*H04W 74/08* (2009.01)
*H04W 84/12* (2009.01)

(52) U.S. Cl.
CPC .... *H04W 72/0453* (2013.01); *H04W 72/0406* (2013.01); *H04W 74/0816* (2013.01); *H04W 84/12* (2013.01)

(58) Field of Classification Search
CPC ......... H04W 72/0406; H04W 72/0453; H04W 74/0816; H04W 84/12
See application file for complete search history.

(56) References Cited

U.S. PATENT DOCUMENTS 10,123,274 B2 * 11/2018 Lee ................... H04W 74/0816
2013/0051328 A1 * 2/2013 Chandra ............... H04W 88/06
370/328

(Continued)

*Primary Examiner* — Kashif Siddiqui
(74) *Attorney, Agent, or Firm* — Canon U.S.A., Inc. I.P. Division

(57) ABSTRACT

802.11 ac networks define an operating band made of an ordered series of 20 MHz channels and authorize a restricted number of possible composite channel configurations to be used for data transmission. A method of transmitting data between a source and a receiver in such a wireless network may comprise, at the source: sending, to the receiver, RTS frames to request reservation of a composite channel, the RTS frames including a flag signalling the source supports transmission over un-authorized composite channels, for instance over sub-channels not contiguous within the operating band; receiving, from the receiver in response to the RTS frames, CTS frames acknowledging reservation of un-authorized composite channel configuration, for instance of non-contiguous sub-channels; and then transmitting, to the receiver, data frames on the reserved sub-channels of the un-authorized configuration, for instance on the reserved non-contiguous sub-channels within the operating band.

8 Claims, 10 Drawing Sheets

(56) References Cited

U.S. PATENT DOCUMENTS

| | | | |
|---|---|---|---|
| 2013/0229996 A1* | 9/2013 | Wang | H04L 1/1685 |
| | | | 370/329 |
| 2014/0337690 A1* | 11/2014 | Zhang | H04L 1/0059 |
| | | | 714/776 |
| 2015/0249997 A1* | 9/2015 | Clegg | H04W 16/32 |
| | | | 370/329 |
| 2016/0050622 A1* | 2/2016 | Azizi | H04L 5/0048 |
| | | | 370/311 |
| 2016/0366633 A1* | 12/2016 | Luo | H04W 40/04 |
| 2016/0366647 A1* | 12/2016 | Lee | H04W 52/0235 |

* cited by examiner

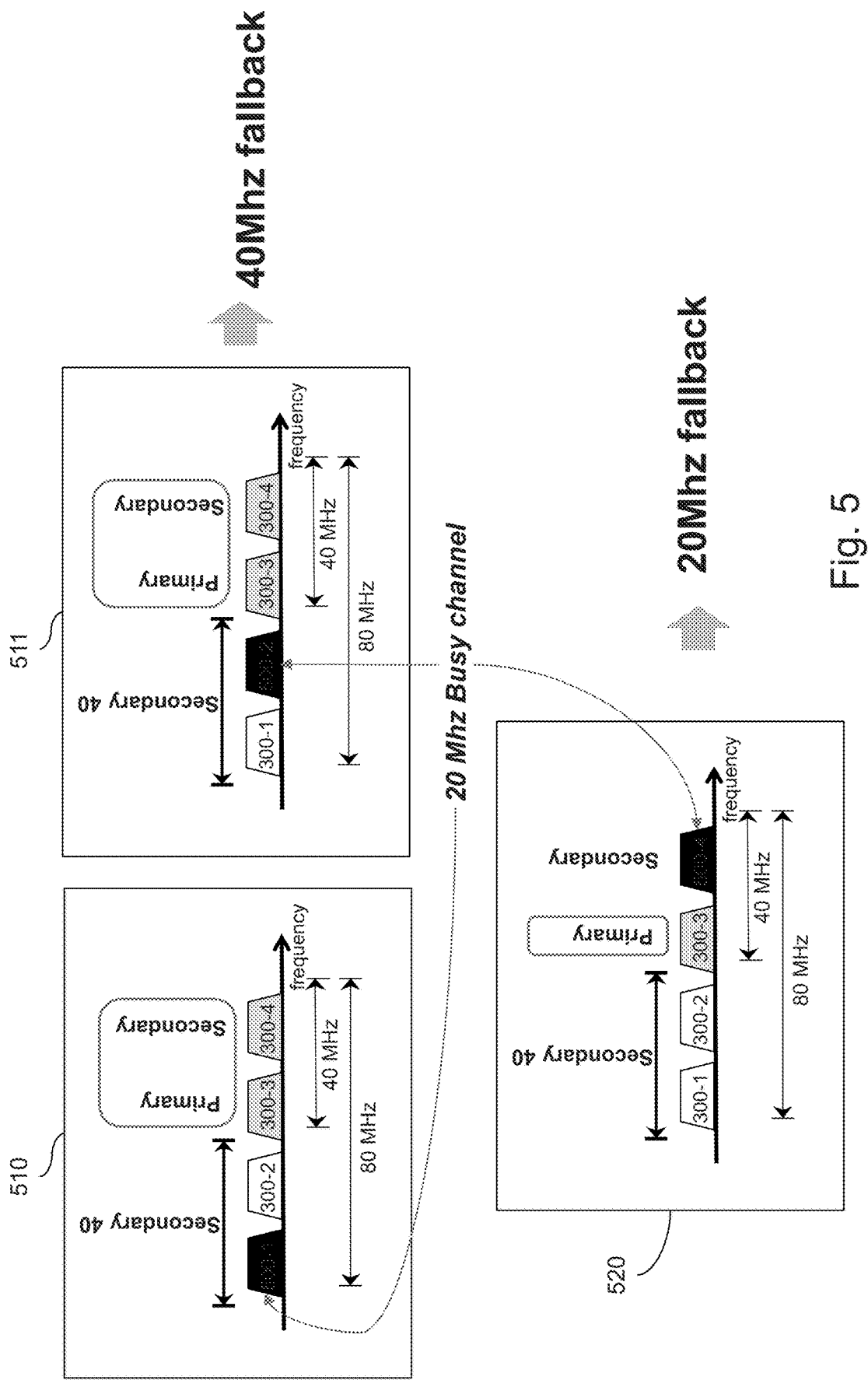

NON-CONTIGUOUS CHANNEL ALLOCATION OVER MULTI-CHANNEL WIRELESS NETWORKS

CROSS REFERENCE TO RELATED APPLICATIONS

The present application is a Continuation of U.S. patent application Ser. No. 15/551,542, filed on Aug. 16, 2017, which is a National Stage Entry of PCT/EP2016/053395, filed Feb. 17, 2016, which claims priority to United Kingdom Patent Application No. 1502793.1 filed Feb. 19, 2015, all of which are hereby incorporated by reference herein in their entireties.

FIELD OF THE INVENTION

The present invention relates generally to communication networks and more specifically to methods and devices for transmitting data over a wireless communication network using Carrier Sense Multiple Access with Collision Avoidance (CSMA/CA), the network being accessible by a plurality of stations.

BACKGROUND OF THE INVENTION

Wireless local area networks (WLANs), such as a wireless medium in a communication network using Carrier Sense Multiple Access with Collision Avoidance (CSMA/CA), are founded on the principles of collision avoidance. Such networks may also conform to a communication standard such as a communication protocol of 802.11 type e.g. Medium Access Control (MAC).

The IEEE 802.11 MAC standard defines the way WLANs must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the medium to become idle so as to try to access to the medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz, two of which may optionally be combined to get a 160 MHz channel as operating band of the wireless network. The 802.11ac standard also tweaks the Request-To-Send (RTS) and Clear-To-Send (CTS) frames to allow for composite channels of varying and predefined bandwidths of 20, 40 or 80 MHz, the composite channels being made of one or more contiguous sub-channels within the operating band. The 160 MHz composite channel is possible by the combination of two 80 MHz composite channels within the 160 MHz operating band.

A composite channel therefore consists of a primary channel and at least a secondary channel of for example 20 MHz each. The primary channel is used by the communication nodes to sense whether or not the channel is idle, which channel can thus be extended using the secondary channel to form a composite channel.

Tertiary and quaternary channels may also take part of the composite channel.

A station is allowed to use as much channel capacity (or bandwidth, i.e. of sub-channels in the composite channel) as is available. The constraint is that the combined channels need to be contiguous for a station with a single antenna station (or single spatial stream).

However, if there is noise or interference on one of the 20 MHz channel within the wider composite channel, the available bandwidth is reduced. The 802.11ac standard only allows a restricted number of composite channel configurations, i.e. of predefined subsets of 20 MHz channel that can be reserved by the 802.11ac stations to transmit data. These are contiguous channels of 20, 40, 80 MHz bandwidth in case of single antenna devices.

Therefore, noise or interference even on a small portion of the composite channel may substantially reduce the available bandwidth of the composite channel to only 40 or 20 MHz., since the resulting reserved bandwidth must meet the 20 MHz, 40 MHz, 80 MHz or 160 MHz channel configurations allowed by the standard.

More recently, Institute of Electrical and Electronics Engineers (IEEE) officially approved the 802.11ax task group, as the successor of 802.11ac. The primary goal of 802.11ax consists to improve data speed for devices used in dense deployment scenarios.

The huge gigabit throughputs that are often attributed to 802.11ac are mainly theoretical. In fact, they represent the overall capacity a Wi-Fi network can support, for instance 1.3 Gbps in today's most advanced routers. However, they can occur only in the rarest circumstances where any individual device would actually be able to connect at such high rates.

The existing 802.11ac standard requires that the composite channel width be specified in the 802.11ac frames, resulting in that channels non-contiguous within the operating band cannot be used although they are available. Therefore, in the 802.11ax research context, there is a need to enhance the efficiency and usage of the wireless channel.

Publication IEEE 802.11-13/1058r0 "*Efficient Wider Bandwidth Operation*" provided during the 802.11ax task group has raised the benefit of using all available channels, even if no solution to do so has been provided.

SUMMARY OF INVENTION

It is a broad objective of the present invention to provide communication methods and devices for transmitting data over an (ad-hoc) wireless network, the physical medium of which being shared between a plurality of communication nodes containing a single antenna device.

The present invention has been devised to overcome the foregoing limitations.

In this context, the invention first provides a method of transmitting data between a source node and a receiving node in an operating band of a wireless network, the operating band being made of an ordered succession (or series) of sub-channels, the method comprising, at the source node:

sending, to the receiving node, at least one medium access requesting frame to request reservation of a composite channel made of sub-channels of the operating band, wherein the medium access requesting frame includes a flag signalling the source node supports transmission over non-contiguous sub-channels within the operating band, i.e. reservation of non-contiguous sub-channels;

receiving, from the receiving node in response to the medium access requesting frame, at least one medium access acknowledging frame acknowledging reservation of sub-channels belonging to the requested composite channel that are not contiguous within the operating band, i.e. of sub-channels that form a reserved non-contiguous composite channel;

transmitting, to the receiving node, data frames on the reserved non-contiguous sub-channels within the operating band.

From the receiving node's perspective, the invention also provides a method of transmitting data between a source node and a receiving node in an operating band of a wireless network, the operating band being made of an ordered succession of sub-channels, the method comprising, at the receiving node:

receiving, from the source node, at least one medium access requesting frame to request reservation of a composite channel made of sub-channels of the operating band;

determining an idle or busy status of each of the sub-channels forming the composite channel, i.e. which requested sub-channels are available and which ones are not;

determining whether or not the medium access requesting frame includes a flag signalling the source node supports transmission over non-contiguous sub-channels within the operating band;

in case of positive determining, sending, to the source node and in response to the medium access requesting frame, at least one medium access acknowledging frame acknowledging reservation of idle sub-channels belonging to the requested composite channel that are not contiguous within the operating band, i.e. of idle or available sub-channels that form a reserved non-contiguous composite channel within the operating band;

receiving, from the source node, data frames on the reserved non-contiguous sub-channels within the operating band.

Correlatively, the invention provides a source node for transmitting data to a receiving node in an operating mode of a wireless network, the operating band being made of an ordered succession of sub-channels, the source node comprising at least one microprocessor configured for carrying out the steps of the method defined above from the source node's perspective.

Also the invention provides a receiving node for receiving data from a source node in an operating mode of a wireless network, the operating band being made of an ordered succession of sub-channels, the receiving node comprising at least one microprocessor configured for carrying out the steps of the method defined above from the receiving node's perspective.

The operating band may correspond to the band defined by the operating mode of the wireless network. In the example of an 802.11ac operating mode, the operating band may be an 80 MHz band or a 160 MHz band (made of two frequency contiguous or non-contiguous 80 MHz sub-bands). Conventionally the operating band is made of successive sub-channels ordered according to their carrier frequencies. It means that the sub-channels of an operating mode are not necessary all frequency contiguous (for instance in the case of the 80+80 MHz bandwidth).

The communication devices or nodes implementing the invention can communicate using sub-channels that are non-contiguous or "non-adjacent" or "non-successive" within the operating band (regardless of whether or not the sub-channels are actually frequency contiguous), thus improving network efficiency.

This is achieved by indicating, in the conventional medium access requesting frame, such as an 802.11 Request-To-Send (RTS) frame, that the requesting node supports communication over non-contiguous channels within the operating band. Indeed, knowing this information, the receiving node can efficiently adapt its response, namely by sending an acknowledgment of reservation for available sub-channels of the requested composite channel that are not contiguous within the operating band, for instance by sending 802.11 Clear-To-Send (CTS) frames on each of the sub-channels that are not contiguous within the operating band.

As a consequence, since those non-contiguous sub-channels within the operating band have been correctly reserved, communication on them between the two source and receiving nodes may take place in a normal way.

This sharply contrasts with 802.11ac conventional behaviours where the CTS frames are only sent to acknowledge reservation of sub-channels which are contiguous within the operating band, as provided by the 802.11ac fall-back schemes, thereby restricting the communication between the source and receiving nodes to a narrower composite channel.

As it will be readily apparent from the description below, the same approach makes it possible to reserve and communicate over contiguous sub-channels within the operating band that do not meet the particular fall-back schemes as currently defined in 802.11ac or ax standard (namely 20 MHz, 40 MHz, 80 MHz channels that include the primary sub-channel). For instance, the signalling flag according to the invention may be used to allow a 60 MHz composite channel to be negotiated between the source and receiving node, thereby enabling 60 MHz communication between them to take place although it is forbidden in 802.11ac.

Optional features of embodiments of the invention are defined in the appended claims. Some of these features are explained here below with reference to a method, while they can be transposed into system features dedicated to any device according to embodiments of the invention.

In embodiments, sending the medium access requesting frame includes sending a duplicated request-to-send frame (in the meaning of the RTS/CTS handshake scheme according to 802.11ac standard) on each sub-channel forming the composite channel. In other words, the same frame including the above-described signalling flag is sent on each sub-channel forming the requested composite channel; and receiving the medium access acknowledging frame includes receiving a clear-to-send frame on each of the reserved non-contiguous sub-channels within the operating band.

From the receiving node's perspective, receiving the medium access requesting frame may include receiving a duplicated request-to-send frame on each sub-channel forming the composite channel; and sending the medium access acknowledging frame may include sending a clear-to-send frame on each of the reserved non-contiguous sub-channels within the operating band.

Thanks to this provision, the method according to the invention remains compliant with 802.11ac standard regarding the reservation of a composite channel, as well as compliant with any 802.11 standard (even oldest ones) to ensure legacy nodes correctly understand the reservation of each sub-channel to avoid collisions.

In other embodiments, the medium access acknowledging frame identifies a contiguous composite channel within the operating band, which contiguous composite channel encompasses the reserved non-contiguous sub-channels within the operating band, and the medium access acknowledging frame includes a flag signalling the receiving node supports transmission over non-contiguous sub-channels within the operating band. Thanks to this provision, full compatibility with 802.11ac standard is kept. In particular, the medium access acknowledging frame (except the unknown signalling flag) is normally processed by any 802.11ac node not implementing the invention.

According to a particular feature, the medium access acknowledging frame specifies one of the channel widths defined in the 802.11ac channel bonding scheme, to identify the contiguous composite channel within the operating band. Thanks to this provision, any legacy node receiving such medium access acknowledging frame will handle it in a conventional way, regardless of whether or not it is support of a transmission over channels non-contiguous in the operating band. As defined in 802.11ac standard, such legacy node will enter a standby mode.

In particular, the specified channel width is preferably the narrowest 802.11ac channel width that encompasses the reserved non-contiguous sub-channels within the operating band. This approach optimizes use of the network bandwidth.

In a variant, to identify the contiguous composite channel within the operating band, the medium access acknowledging frame includes the same channel width as a requested channel width included in the medium access requesting frame. Of course, such channel width is preferably (but not necessarily) one of the channel widths defined in the 802.11ac channel bonding scheme.

In some embodiments, the composite channel defined in the medium access requesting frame is made of sub-channels that are non-contiguous within the operating band. This shows that the present invention may be used even when the source node detects available sub-channels that are not contiguous within the operating band. This sharply contrasts with the conventional 802.11ac approach according to which the source node can only request for one of the predefined bandwidths corresponding to available contiguous sub-channels within the operating band.

According to a particular feature, the medium access requesting frame identifies a contiguous composite channel within the operating band, which contiguous composite channel encompasses the requested composite channel. Thanks to this provision, full compatibility with 802.11ac standard is kept.

In particular, to identify the contiguous composite channel that encompasses the requested composite channel, the medium access requesting frame specifies one of the channel widths defined in the 802.11ac channel bonding scheme. This is to keep compliance with 802.11 standard, in a way that any 802.11 node is kept informed regardless of whether it implements the invention or not.

According to embodiments, the signalling flag is included in a header of the medium access requesting frame and/or medium access acknowledging frame. Thanks to this provision, the signalling flag can be easily added to any 802.11ac frame. In addition, it can be easily made meaningless for 802.11 nodes not implementing the invention, ensuring backward compatibility.

For instance, the signalling flag includes one of the following bits:

bit 2 of VHT-SIG-A1 header portion according to the 802.11ac standard;

bit 23 of VHT-SIG-A1 header portion according to the 802.11ac standard;

bit 9 of VHT-SIG-A2 header portion according to the 802.11ac standard.

These specific bits are "reserved" bits in the 802.11ac standard. As a consequence, using them as proposed in this above configuration does not impact the behaviour of 802.11ac-compliant nodes that do not implement the invention. This is because these bits are not taken into account by these nodes. VHT-SIG-A1 and VHT-SIG-A2 form the two parts of the VHT Signal A field of the 802.11ac frame header, each of which corresponds to an OFDM symbol.

According to embodiments, the composite channel and the reserved sub-channels include a primary sub-channel according to the 802.11ac standard. Again, this provision contributes to keep full backward compatibility with any 802.11 standard.

According to embodiments, the data frames also include a flag signalling the transmission between the source and receiving nodes is performed using transmission over non-contiguous sub-channels within the operating band. This signalling within the data frames makes it possible to signal the current transmission mode (i.e. with or without non-contiguous sub-channels) to the receiving node. Thanks to this information, it is not required for the latter to locally store and manage contextual data to keep knowledge of the specific current transmission mode over time.

Referring back to the exemplary use of the invention to enable communication on a 60 MHz composite channel made of three contiguous sub-channels as currently forbidden in 802.11ac, the present invention also provides a method of transmitting data between a source node and a receiving node in an operating band of a wireless network, the operating band being made of an ordered succession of sub-channels, an operating mode of the wireless network defining a restricted number of predefined sub-channel subsets that are available for reservation by any wireless node of the wireless network to transmit data, the sub-channel subsets being made of contiguous sub-channels within the operating band, the method comprising, at the source node:

sending, to the receiving node, at least one medium access requesting frame to request reservation of a composite channel made of sub-channels of the operating band, wherein the medium access requesting frame includes a flag signalling the source node supports transmission over subsets of sub-channels different from the predefined subsets;

receiving, from the receiving node in response to the medium access requesting frame, at least one medium access acknowledging frame acknowledging reservation of a subset of sub-channels different from the predefined subsets;

transmitting, to the receiving node, data frames on the reserved subset of sub-channels within the operating band.

From the receiving node's perspective, the invention also provides a method of transmitting data between a source node and a receiving node in an operating band of a wireless network, the operating band being made of an ordered succession of sub-channels, an operating mode of the wireless network defining a restricted number of predefined sub-channel subsets that are available for reservation by any wireless node of the wireless network to transmit data, the sub-channel subsets being made of contiguous sub-channels within the operating band, the method comprising, at the receiving node:

receiving, from the source node, at least one medium access requesting frame to request reservation of a composite channel made of sub-channels of the operating band;

determining an idle or busy status of each of the sub-channels forming the composite channel;

determining whether or not the medium access requesting frame includes a flag signalling the source node supports transmission over subsets of sub-channels different from the predefined subsets;

in case of positive determining, sending, to the source node and in response to the medium access requesting frame, at least one medium access acknowledging frame acknowledging reservation of a subset of sub-channels different from the predefined subsets;

receiving, from the source node, data frames on the reserved subset of sub-channels within the operating band.

Correlatively, the invention provides a source node for transmitting data to a receiving node in an operating mode of a wireless network, the operating band being made of an ordered succession of sub-channels, an operating mode of the wireless network defining a restricted number of predefined sub-channel subsets that are available for reservation by any wireless node of the wireless network to transmit data, the sub-channel subsets being made of contiguous sub-channels within the operating band, the source node comprising at least one microprocessor configured for carrying out the steps of the method defined above from the source node's perspective.

Also the invention provides a receiving node for receiving data from a source node in an operating mode of a wireless network, the operating band being made of an ordered succession of sub-channels, an operating mode of the wireless network defining a restricted number of predefined sub-channel subsets that are available for reservation by any wireless node of the wireless network to transmit data, the sub-channel subsets being made of contiguous sub-channels within the operating band, the receiving node comprising at least one microprocessor configured for carrying out the steps of the method defined above from the receiving node's perspective.

According to this approach of the invention, the signalling flag is used to release or loose a constraint, such as the 802.11ac fallback constraint, of necessarily using one of the predefined contiguous composite channel configurations (i.e. one of the predefined subsets of sub-channels that are available for reservation by any wireless node of the wireless network to transmit data). As a consequence, the receiving node that implements the invention can accept using a non-predefined configuration and thus send corresponding CTS frames (in 802.11), ensuring the other legacy nodes will not interfere on the reserved sub-channels.

As a result, a better use of the network bandwidth (operating band) is obtained). As an example, a 60 MHz composite channel may be obtained. Also un-authorized 40 MHz composite channels can be obtained (for instance a primary sub-channel together with a tertiary or quaternary sub-channel, when the secondary sub-channel and one of the tertiary and quaternary sub-channels are busy).

The signalling flag to release the predefined configuration constraint can be the same as the signalling flag introduced above to signal the source node supports transmission over non-contiguous sub-channels within the operating band. In a variant, two separate flags may be used.

Optional features of embodiments of the invention are defined in the appended claims. Some of these features are explained here below with reference to a method, while they can be transposed into system features dedicated to any device according to embodiments of the invention.

In embodiments, the operating mode of the wireless network is according to the 802.11ac standard, and the restricted number of predefined sub-channel subsets is made of 20 MHz, 40 MHz, 80 MHz and optionally 160 MHz bandwidths within the operating band. These embodiments are specific to 802.11ac.

According to a specific feature, the reserved subset of sub-channels is made of three 20 MHz sub-channels that are contiguous within the operating band. Of course, as required by 802.11ac, the three sub-channels preferably include the "primary channel" on which the contention process (i.e. backoff procedure) is performed by the nodes concerned. Variants are directed to reserved subsets made of five, six or seven 20 MHz contiguous sub-channels within the operating band.

In some embodiments, the reserved subset of sub-channels is made of sub-channels that are not contiguous within the operating band. For instance, it may correspond to the use of non-contiguous sub-channels as defined earlier in the document. As a consequence, all the embodiments that may derive from the use of a flag signalling the source node supports transmission over non-contiguous sub-channels within the operating band as defined above can be used in the present embodiments.

In a variant, the reserved subset of sub-channels is made of sub-channels that are contiguous within the operating band. Using 60 MHz contiguous sub-channels is one example of this variant in the context of 802.11ac.

Another aspect of the invention relates to a non-transitory computer-readable medium storing a program which, when executed by a microprocessor or computer system in a device for transmitting data between a source node and a receiving node in an operating band of a wireless network, the operating band being made of an ordered succession of sub-channels, causes the device to perform any of the methods as defined above.

The non-transitory computer-readable medium may have features and advantages that are analogous to those set out above and below in relation to the methods and devices.

Another aspect of the invention relates to a method of transmitting data between a source node and a receiving node over a wireless network, substantially as herein described with reference to, and as shown in, FIG. 8, or FIGS. 8 and 12 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5 illustrates three examples of dynamic fallback to narrower channel widths in the presence of co-channel interference or noise that only affects a portion of the larger channel;

DETAILED DESCRIPTION

The invention will now be described by means of specific non-limiting exemplary embodiments and by reference to the figures.

Figure 1:
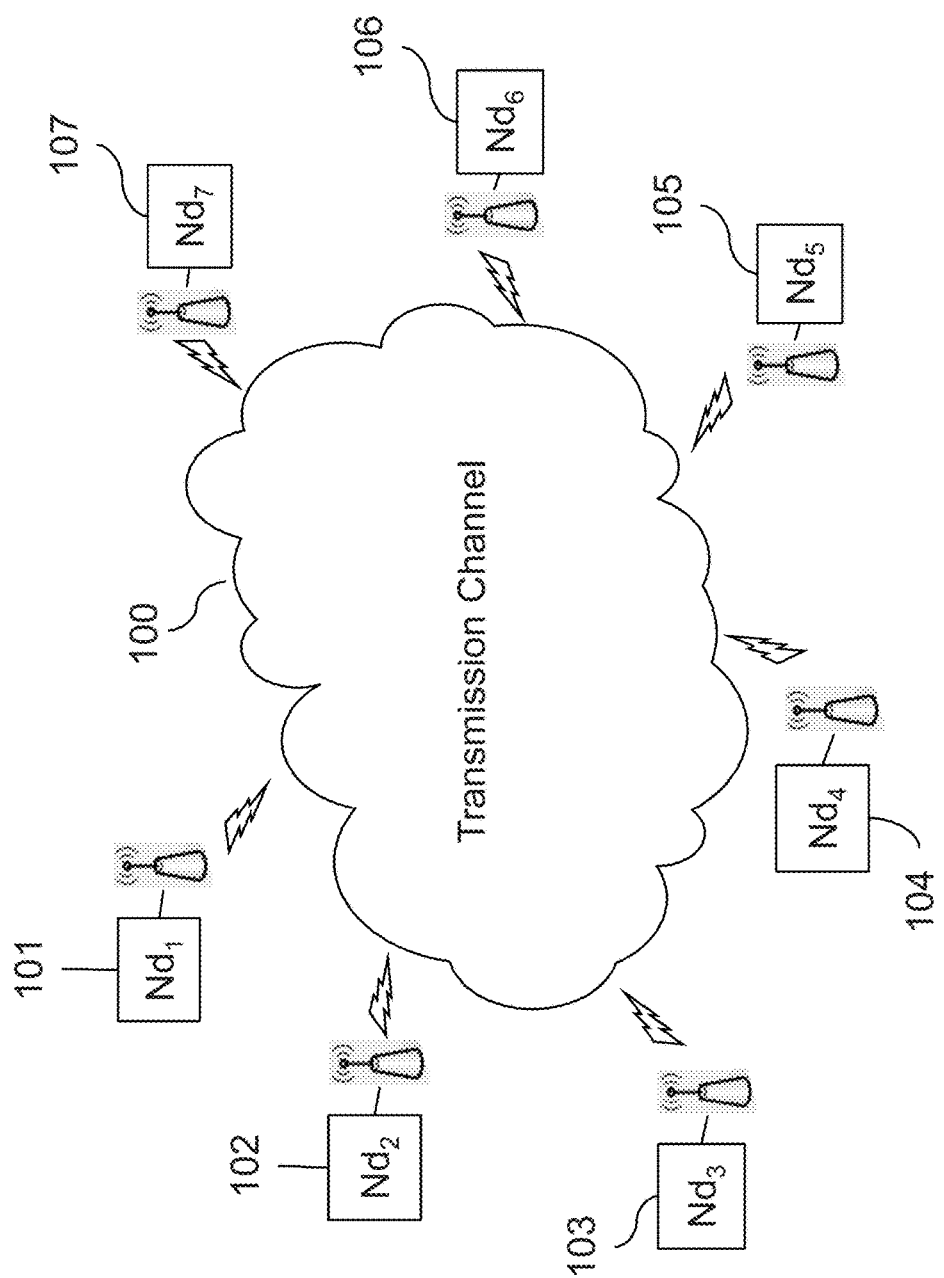
FIG. 1 illustrates a typical wireless communication system in which embodiments of the invention may be implemented.

FIG. 1 illustrates a communication system in which several communication nodes exchange data frames over a radio transmission channel 100 of a wireless local area network (WLAN). The radio transmission channel 100 is defined by an operating band, for instance with a bandwidth available for the communication nodes.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a transmitting node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the transmitting node continues to wait until the radio medium becomes idle. To do so, it starts a countdown backoff counter designed to expire after a number of timeslots, chosen randomly between [0, CW], CW (integer) being referred to as the Contention Window. This backoff mechanism or procedure is the basis of the collision avoidance mechanism that defers the transmission time for a random interval, thus reducing the probability of collisions on the shared channel. After the backoff time period, the transmitting node may send data or control frames if the medium is idle.

One problem of wireless data communications is that it is not possible for the transmitting node to listen while sending, thus preventing the transmitting node from detecting data corruption due to channel fading or interference or collision phenomena. A transmitting node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the transmitting node that no corruption of the sent data frames occurred.

The ACK is transmitted at the end of reception of the data frame, immediately after a period of time called Short InterFrame Space (SIFS).

If the transmitting node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
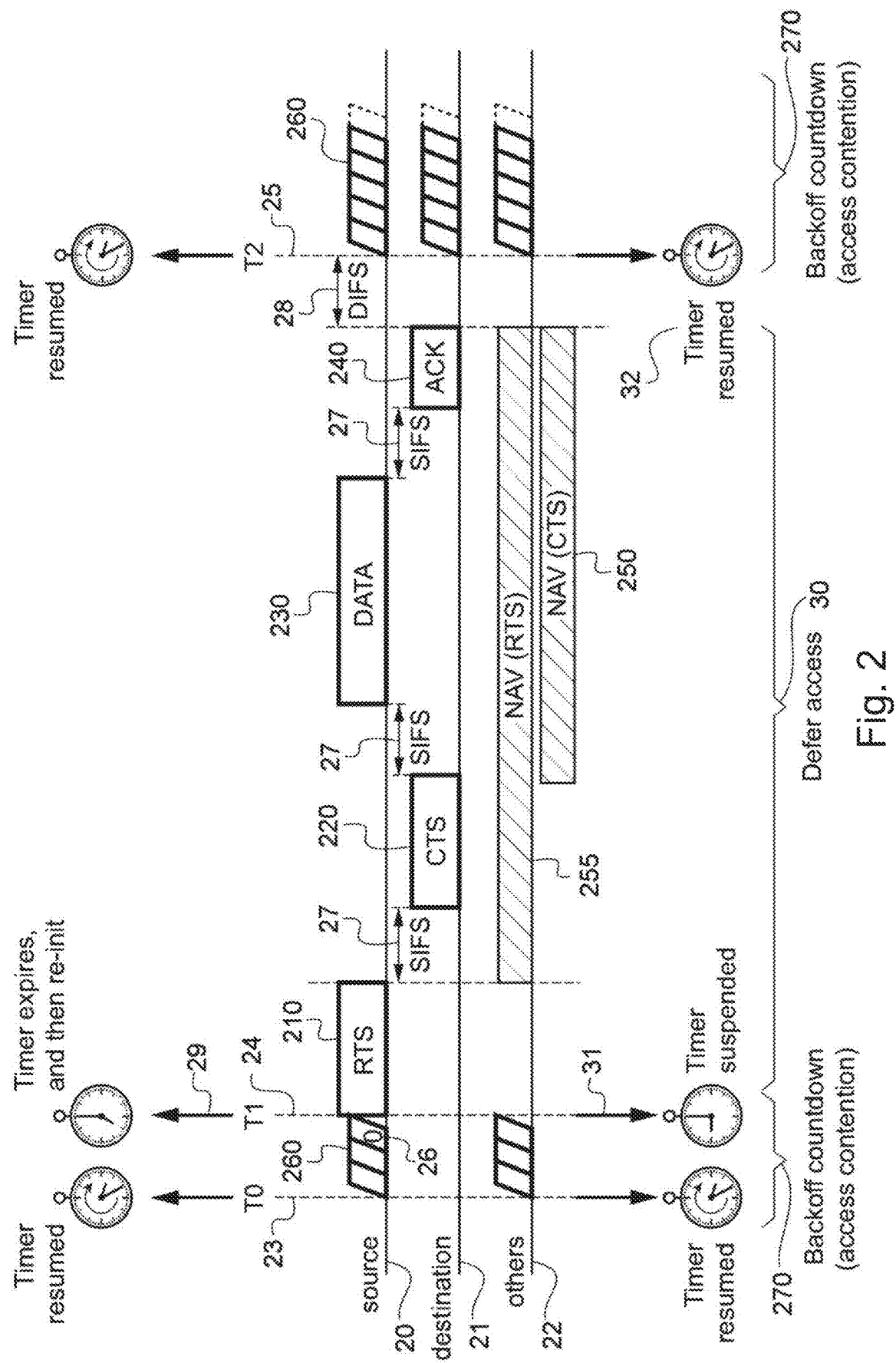
FIG. 2 is a timeline schematically illustrating a conventional communication mechanism according to the IEEE 802.11 standard.

FIG. 2 illustrates the behaviour of three groups of nodes during a conventional communication over a 20 MHz channel of the 802.11 medium: transmitting or source node 20, receiving or addressee or destination node 21 and other nodes 22 not involved in the current communication.

Upon starting the backoff process 270 prior to transmitting data, a station e.g. transmitting node 20, initializes its backoff time counter to a random value as explained above. The backoff time counter is decremented once every time slot interval 260 for as long as the radio medium is sensed idle (countdown starts from T0, 23 as shown in the Figure).

The time unit in the 802.11 standard is the slot time called 'aSlotTime' parameter. This parameter is specified by the PHY (physical) layer (for example, aSlotTime is equal to 9 μs for the 802.11n standard). All dedicated space durations (e.g. backoff) add multiples of this time unit to the SIFS value.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to transmitting node 20 ends and the DIFS period 28 elapses. DIFS 28 (DCF inter-frame space) thus defines the minimum waiting time for a transmitting node before trying to transmit some data. In practice, DIFS=SIFS+2*aSlot-Time.

When the backoff time counter reaches zero (26) at T1, the timer expires, the corresponding node 20 requests access onto the medium in order to be granted a TXOP, and the backoff time counter is reinitialized 29 using a new random backoff value.

In the example of the Figure implementing the RTS/CTS scheme, at T1, the transmitting node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the address of the receiving node ("destination 21") and the duration for which the radio medium is to be reserved for transmitting the control frames (RTS/CTS) and the data frames 230.

Upon receiving the RTS frame and if the radio medium is sensed as being idle, the receiving node 21 responds, after a SIFS time period 27 (for example, SIFS is equal to 16 µs for the 802.11n standard), with a medium access response, known as a Clear-To-Send (CTS) frame. The CTS frame indicates the remaining time required for transmitting the data frames, computed from the time point at which the CTS frame starts to be sent.

The CTS frame is considered by the transmitting node 20 as an acknowledgment of its request to reserve the shared radio medium for a given time duration.

Thus, the transmitting node 20 expects to receive a CTS frame 220 from the destination node 21 before sending data 230 using unique and unicast (one source address and one addressee or destination address) frames.

The transmitting node 20 is thus allowed to send the data frames 230 upon correctly receiving the CTS frame 220 and after a new SIFS time period 27.

An ACK frame 240 is sent by the receiving node 21 after having correctly received the data frames sent, after a new SIFS time period 27.

If the transmitting node 20 does not receive the ACK 240 within a specified ACK Timeout (generally within the TXOP), or if it detects the transmission of a different frame on the radio medium, it reschedules the frame transmission using the backoff procedure anew.

Since the RTS/CTS four-way handshaking mechanism 210/220 is optional in the 802.11 standard, it is possible for the transmitting node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will be busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening node 22 thus keeps in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that the destination node 21 does not receive the RTS frame 210 correctly due to a message/frame collision or to fading. Even if it does receive it, the destination node 21 may not always respond with a CTS 220 because, for example, its NAV is set (i.e. another node has already reserved the medium). In any case, the transmitting node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1. If both transmitting nodes use the RTS/CTS mechanism, this collision can only occur for the RTS frames. Fortunately, such collision is early detected by the transmitting nodes since it is quickly determined that no CTS response has been received.

As described above, the original IEEE 802.11 MAC always sends an acknowledgement (ACK) frame 240 after each data frame 230 received.

However, such collisions limit the optimal functioning of the radio network. As described above, simultaneous transmission attempts from various wireless nodes lead to collisions. The 802.11 backoff procedure was first introduced for the DCF mode as the basic solution for collision avoidance, and further employed by the IEEE 802.11e standard to solve the problem of internal collisions between enhanced distributed channel access functions (EDCAFs). In the emerging IEEE 802.11n/ac/ax standards, the backoff procedure is still used as the fundamental approach for supporting distributed access among mobile stations or nodes.

The rapid growth of smart mobile devices is driving mobile data usage and 802.11 WLAN proliferation, creating an ever-increasing demand for faster wireless networks to support bandwidth-intensive applications, such as web browsing and video streaming. The new IEEE 802.11ac standard is designed to meet this demand, by providing major performance improvements over previous 802.11 generations.

The IEEE 802.11ac standard is an emerging very high throughput (VHT) wireless local access network (WLAN) standard that can achieve physical layer (PHY) data rates of up to 7 Gbps for the 5 GHz band.

The scope of 802.11ac includes single link throughput supporting at least 500 Mbps, multiple-station throughput of at least 1 Gbps and backward compatibility and coexistence with legacy 802.11 devices in the 5 GHz band.

Consequently, this standard is targeted at higher data rate services such as high-definition television, wireless display (high-definition multimedia interface—HDMI—replacement), wireless docking (wireless connection with peripherals), and rapid sync-and-go (quick upload/download).

Contrary to 802.11n where each communication node should support up to two spatial streams (SSs) and an operating band of 40 MHz bandwidth, only one spatial stream (and this only one antenna par device) is required in 802.11ac or 802.11ax, while operating bands of 80 MHz or 160 MHz bandwidth are allowed.

One reason for such a change in the new versions of 802.11 is that increasing the number of antennas often results in higher cost. Indeed, supporting multiple Spatial Streams (SS) has been considered as requiring at least the same number of antennas (and as much reception chains behind these antennas), thus important costs. Consequently, a majority of 802.11n devices available on the market could only support a single SS.

In 802.11ac, support for only one SS is required so that devices, and especially smartphones, could be labelled as '802.11ac compliant'. The operating mode with an 80 MHz operating band is made mandatory as a lower cost alternative to the two SS and 40 MHz operating band. Hence, the operating modes that utilize more than one spatial stream are now become optional in 802.11ac.

As a result, 802.11ac is targeting larger bandwidth transmission through multi-channel operations. The wider channel aspect is further described in regards to FIG. 3. A MAC mechanism for dynamically protecting and allocating multiple channels is presented in regards to FIG. 4.

Figure 3A:
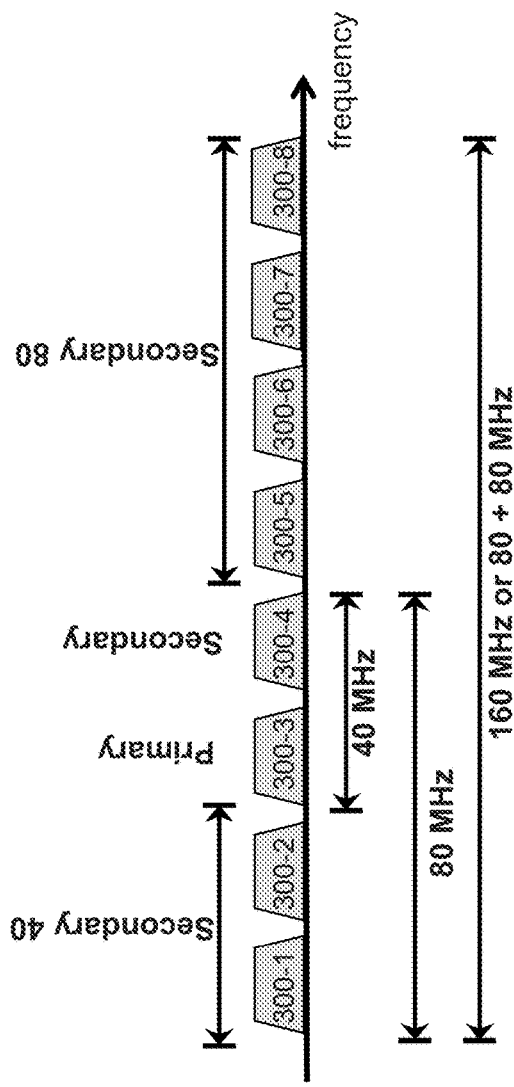
FIG. 3a illustrates 802.11ac channel allocation that support channel bandwidth of 20 MHz, 40 MHz, 80 MHz or 160 MHz as known in the art.

In order to support wider channel bandwidths within the operating band, the operating band in 802.11ac is made of an ordered succession (or series) of sub-channels as shown for instance in FIG. 3a. IEEE 802.11ac introduces support of a restricted number of predefined subsets of these sub-channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels (or sub-channels) 300-1 to 300-8 are concatenated to form wider communication composite channels.

In the standard, the sub-channels of each predefined 40 MHz, 80 MHz or 160 MHz subset are contiguous within the operating band, i.e. no hole (i.e. missing sub-channel) within the sub-channels as ordered in the operating band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. The support of 40 MHz and 80 MHz channel bandwidths is mandatory while support of 160 MHz and 80+80 MHz is optional (80+80 MHz means that a multi-channel is made of two frequency non-contiguous channels having a bandwidth of 80 MHz).

Figure 3B:
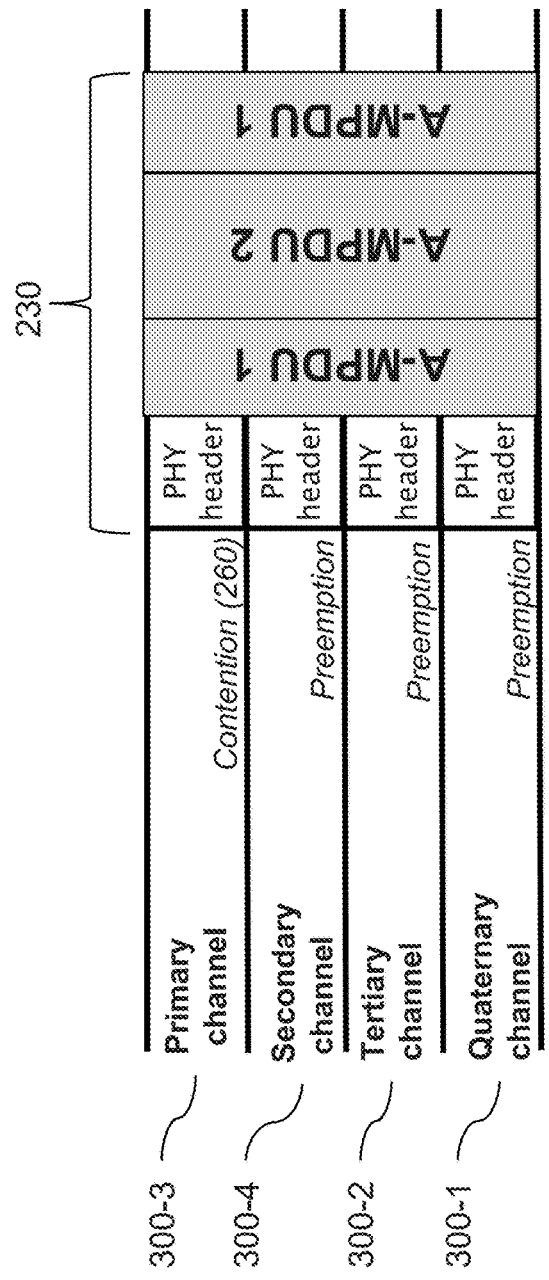
FIG. 3b illustrates an example of 802.11ac multichannel station using a transmission opportunity on an 80 MHz channel as known in the art.

A multichannel communication node (accessing an 80 MHz operating band in the illustrated example of FIG. 3b) is granted a TxOP through the enhanced distributed channel access (EDCA) mechanism on the "primary channel" (300-3). Indeed, for each channel bandwidth, 802.11ac designates one channel as "primary," meaning that it is used for transmission at that bandwidth. It shall, however, transmit an 80 MHz PPDU (PPDU means PLCP Protocol Data Unit, with PLCP for Physical Layer Convergence Procedure; basically a PPDU refers to an 802.11 physical frame) only if all other channels have been idle for at least a point coordination function (PCF) inter-frame spacing (PIFS). If at least one of the secondary channels has not been idle for a PIFS, then the node must either restart its backoff count, or use the obtained TxOP for 40 MHz or 20 MHz PPDUs.

The vertical aggregation scheme reflects the extension of the payload 230 to all sub-channels. If there is only one collision in one of the channels at a given time, the risks of having a corrupted segment of these sequences are very high despite the error-correcting decoding process. All MPDU (MAC Protocol Data Unit) frames inside the PPDU could thus automatically be considered as incorrect.

In the description below, the words "channel", "20 MHz channel" or "sub-channel" mainly refer to the same technical feature, i.e. any channel that complies with 802.11n or older standards. "Composite channel" thus refers to the additional feature of 802.11ac in which a composite channel is made of one or more sub-channels that are contiguous within the operating band of the wireless network. In 802.11ac, the composite channels are 20 MHz wide (if made of only one sub-channel) or 40 MHz wide or 80 MHz wide or, optionally, 160 MHz wide.

Further (FIG. 4), relying on its multi-channel capability, 802.11ac supports enhanced protection in which the RTS/CTS handshake mechanism is modified to support static or dynamic bandwidth reservation and to carry the channel bandwidth information.

Bandwidth signalling is added to the RTS and CTS frames (i.e. 20, 40, 80 or 160 MHz values is added). A source node sends a RTS frame with an indication of the bandwidth of the intended transmission. The RTS frame is replicated on each 20 MHz channels forming the targeted bandwidth. The receiving node replies with a CTS frame on each (sub-)channel sensed as free.

As an example, prior to transmitting a 80 MHz data frame, the source node, STA1, transmits an RTS frame 410 configured to use the 20 MHz channel bandwidth of each of 20 MHz channels forming the 80 MHz operating band. That is, in association with the 80 MHz operating band, a total of four RTS frames is transmitted in the form of duplicated PPDUs over the four 20 MHz (sub-)channels.

The receiving node, STA2, answers in each 20 MHz channel in which an RTS frame transmitted by STA1 has been successfully received. The response is made using a CTS frame configured to allow use of the respective 20 MHz channel bandwidth. If STA2 has successfully received RTS frames from the entire 80 MHz bandwidth and the four (sub-)channels are sensed as idle, a total of four CTS frames is transmitted to cover the 80 MHz channel bandwidth.

If STA1 receives all the four CTS frames related to the 80 MHz channel, a DATA frame 430-1 can be transmitted using the whole 80 MHz channel bandwidth.

It is expected that every nearby node (legacy or 802.11ac, i.e. which is neither STA1 nor STA2) can receive an RTS on its primary channel. Each of these nodes then sets its NAV to the value specified in the RTS frame. Before a receiving node replies with a CTS, it checks if any of the channels in the 80 MHz band is busy. The receiving node only replies with a CTS on those channels that are sensed as idle, and reports the total available bandwidth in the CTS. As with the RTS, the CTS is sent in an 802.11a PPDU format and is replicated over the different 20 MHz channels that have been sensed as idle.

Figure 4:
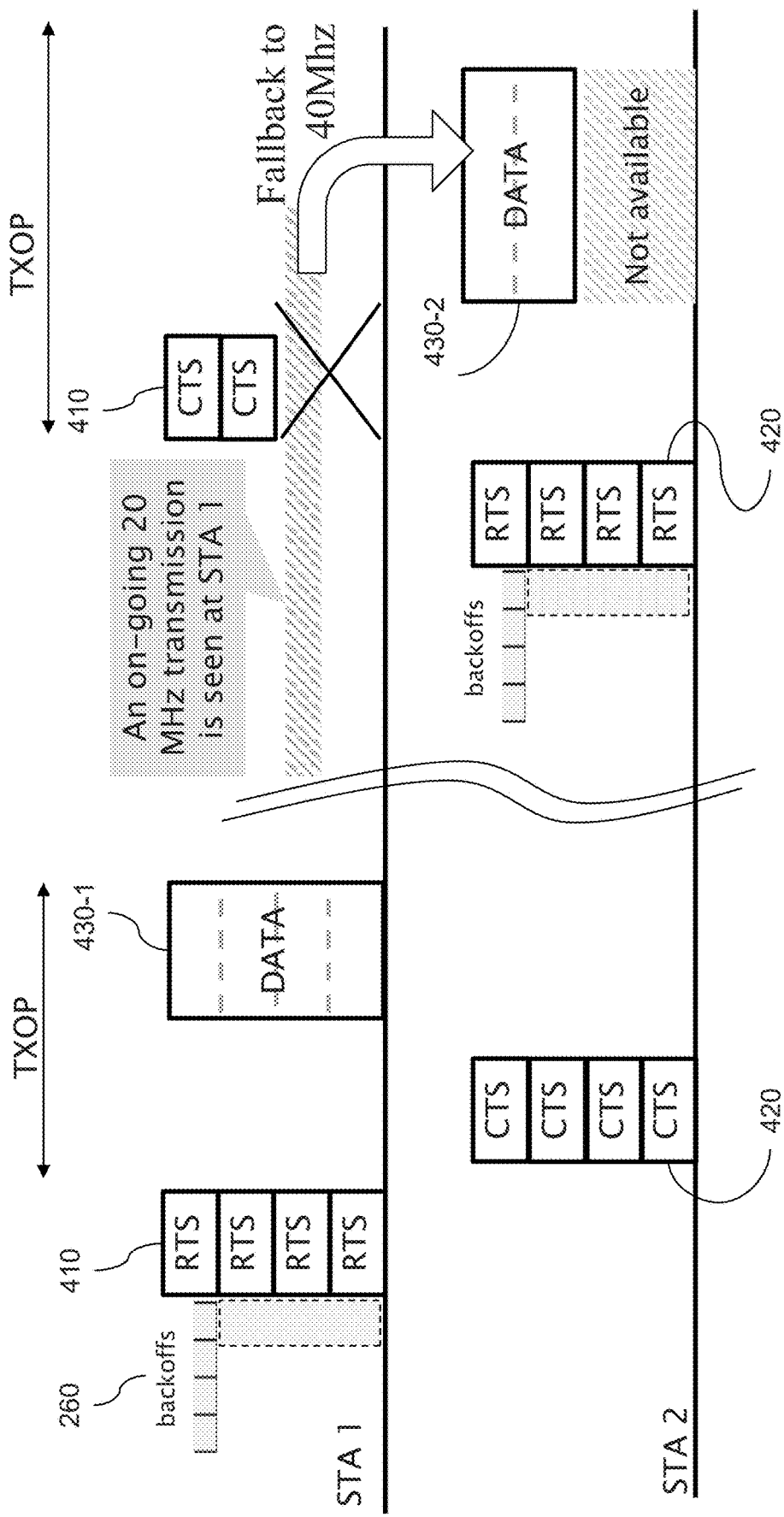
FIG. 4 shows a conceptual diagram illustrating a broadband channel access mechanism employing an 80 MHz channel bandwidth as known in the art.

On the right side of FIG. 4, a nearby station or node is already transmitting on the third 20 MHz channel as shown before STA2 starts sending four RTS to reserve an 80 MHz TxOP. Next, STA1 has to inform STA2 by replying with CTSs only in the contiguous idle channels that include the primary channel (two CTS are transmitted in the present example). Next, a DATA frame 430-2 can be transmitted using only 40 MHz channel bandwidth. The ability of IEEE 802.11ac standard to fall back to lower bandwidth modes in case not all the targeted bandwidth is available is known as a fallback mechanism.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

As a result, the fallback mechanism currently provided in the 802.11ac standard is too limitative.

A channel interference (FIG. 5) is typically performed by a legacy 802.11a or 802.11n node (transmitting on a 20 MHz channel), so that the 802.11ac node may transmit over a fraction of the original requested bandwidth: depending of which 20 Mhz channels (300) are busy, the channel width of resulting composite channel is reduced from requested 80 MHz to a predefined channel width of the 802.11ac channel bonding scheme, namely to 40 MHz (cases 510 and 511) or to 20 Mhz (case 520), whereas a 60 Mhz (i.e. additional 20 MHz or 40 MHz respectively) bandwidth is potentially available.

One can note the 802.11ac standard has not envisaged using such lost bandwidth, as the RTS/CTS control frames embed a bandwidth indication only supporting predefined channel widths, namely 20, 40, 80 or 160 Mhz.

This bandwidth allocation deficiency can be especially problematic with personal devices on which a central organization has little or even no control to select the wireless channels of the 5 GHz or the like band. This is ascertained in distributed environments, which are by essence not managed at all.

The present invention falls within enhancement of the 802.11ac standard, and more precisely into the context of 802.11ax wherein dense wireless environments are more ascertained to suffer from previous limitations.

The present invention provides enhanced channel allocation methods and devices for data communication over an ad-hoc wireless network, the physical medium of which being shared between a plurality of communication stations (also referred to as nodes or devices).

An exemplary ad-hoc wireless network is an IEEE 802.11ac network (and upper versions) in which an operating band made of an ordered series of sub-channels is used and in which a restricted number of predefined composite channel configurations is available. However, the invention applies to any wireless network where a source node 101-107 sends data of a data stream to a receiving node 101-107 using multiple channels (see FIG. 1). The invention is especially suitable for wireless stations having only one Spatial Stream and labeled as '802.11ac compliant'.

The behaviour of communication nodes during a conventional communication over an 802.11 medium has been recalled above with reference to FIGS. 1 to 5.

One aspect of embodiments of the present invention provides using medium access requesting frames, i.e. RTS frames, that include a flag signalling the source node supports transmission over sub-channels that are not contiguous within the operating band. This makes it possible for the receiving node to acknowledge reservation (using CTS frames) not only of conventional contiguous sub-channels but also of idle sub-channels of the requested composite channel that are not contiguous within the operating band, i.e. of idle or available sub-channels that form a reserved non-contiguous composite channel.

More generally, the signalling flag may signal the source node supports transmission over subsets of sub-channels different from the predefined subsets, i.e. over non-authorized composite channel configurations.

In other words, the invention provides signalling means making it possible to use non-contiguous channels within the operating band (and more generally unauthorized composite channel configurations) in anticipation of the foreseen future evolution of the 802.11 standard.

One key aspect of the invention is that it still complies with legacy nodes, i.e. with nodes that do not implement the invention. A legacy environment typically describes a situation in which the legacy nodes and the nodes implementing the invention coexist and are competing to access the shared wireless channels, possibly using a composite channel The invention ensures the legacy nodes still operate in a conventional way, despite some other nodes implement the invention. It means that the signalling means according to embodiments of the invention are advantageously transparent for those legacy nodes (i.e. not taken into account).

Figure 6:
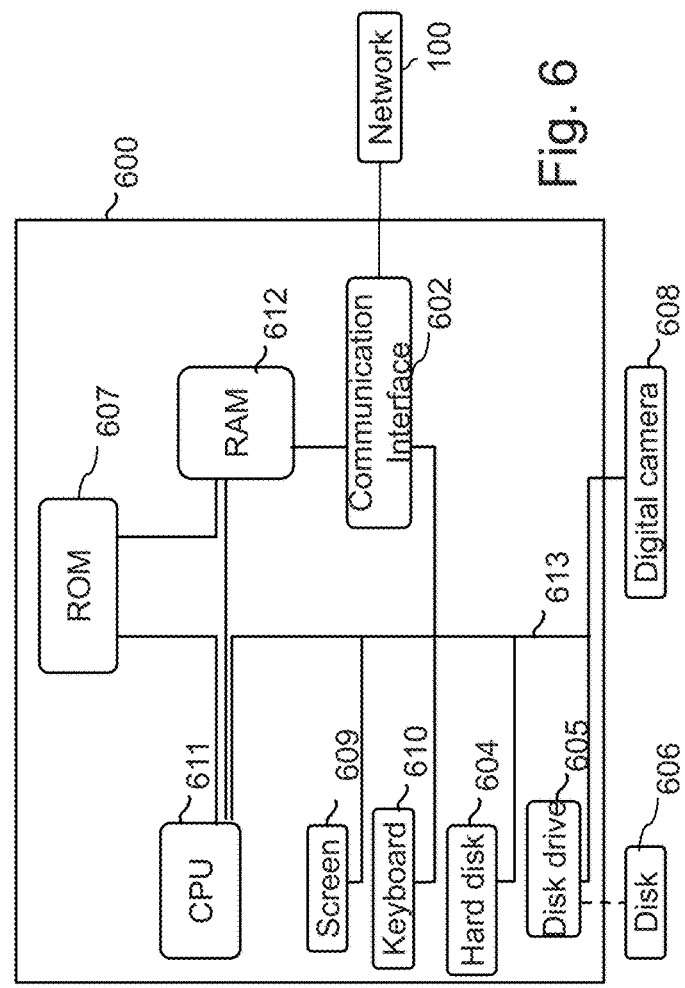
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames are transmitted, for example a wireless communication network according to the 802.11ac protocol. The data frames and aggregated frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
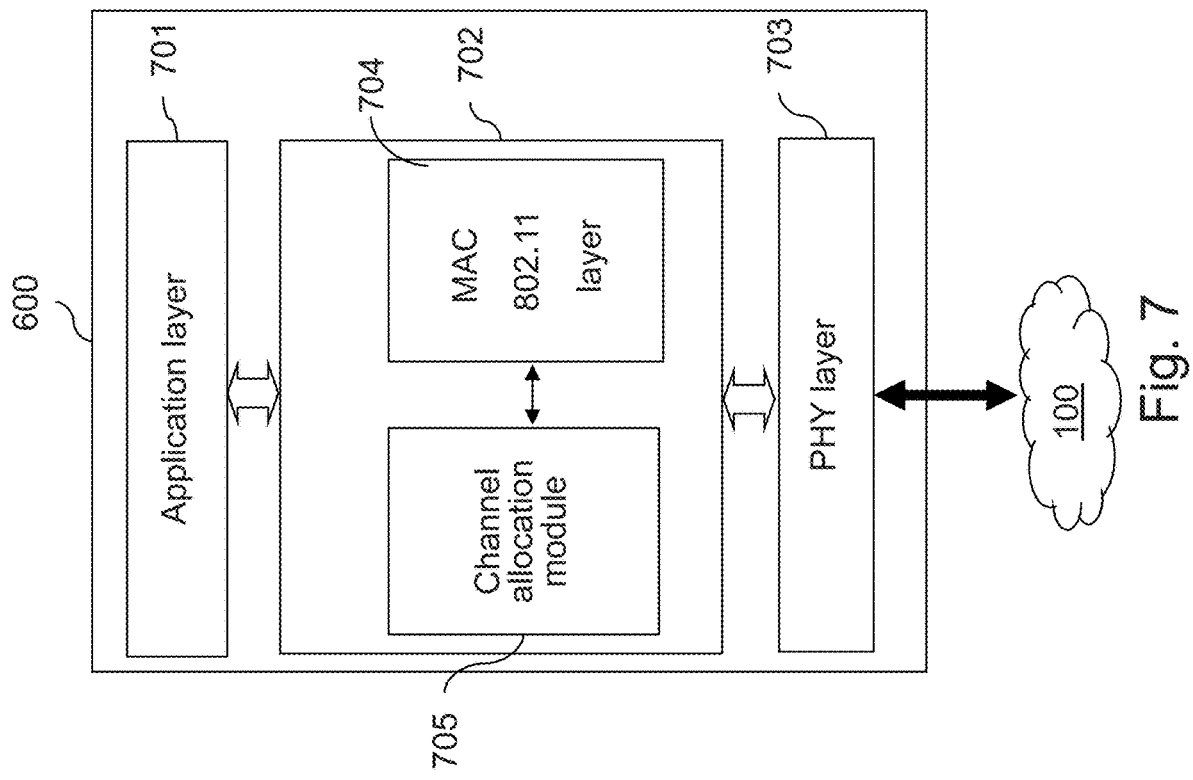
FIG. 7 shows a schematic representation of a wireless communication device in accordance with embodiments of the present invention.

FIG. 7 is a block diagram schematically illustrating the architecture of a communication device also called node (or station) 600 adapted to carry out, at least partially, the invention. As illustrated, node 600 comprises a physical (PHY) layer block 703, a MAC layer block 702, and an application layer block 701.

The PHY layer block 703 (here a 802.11 standardized PHY layer) has the task of formatting and sending or receiving frames over the radio medium used 100, such as 802.11 frames, for instance medium access requesting frames of the RTS type to reserve a transmission slot, medium access acknowledging frames of the CTS type to acknowledge reservation of a transmission slot, as well as of MAC data frames and aggregated frames to/from that radio medium.

The MAC layer block or controller 702 preferably comprises a MAC 802.11 layer 704 implementing conventional 802.11 MAC operations, and an additional block 705 for carrying out, at least partially, the invention. The MAC layer block 702 may optionally be implemented in software, which software is loaded into RAM 612 and executed by CPU 611.

Preferably, the additional block, referred to channel allocation module 705, implements the part of the invention that regards node 600, i.e. transmitting operations for a source node, receiving operations for a receiving node and monitoring operations for any other node that is able to understand the signalling flag according to the invention.

For both source node's perspective and receiving node's perspective, channel allocation module 705 senses which channels are available and contributes to an enhanced dynamic channel allocation procedure even if the available channels (or "sub-channels") form a non-contiguous composite channel or a composite channel that is different from predefined composite channel configurations that are allowed, for instance by a standard.

In this context, the source node is designed to build and send one or more medium access requesting frame (e.g. RTS) that includes a flag signalling the source node supports transmission over non-contiguous sub-channels within the operating band, i.e. reservation of non-contiguous sub-channels within the operating band.

On its side, the receiving node is designed to build and send (in response to RTS frame or frames) one or more medium access acknowledging frame (e.g. CTS) to acknowledge reservation of non-contiguous idle sub-channels within the composite channel requested by the source node.

On top of the Figure, application layer block 701 runs an application that generates and receives data packets, for example data packets of a video stream. Application layer block 701 represents all the stack layers above MAC layer according ISO standardization.

Figure 8:
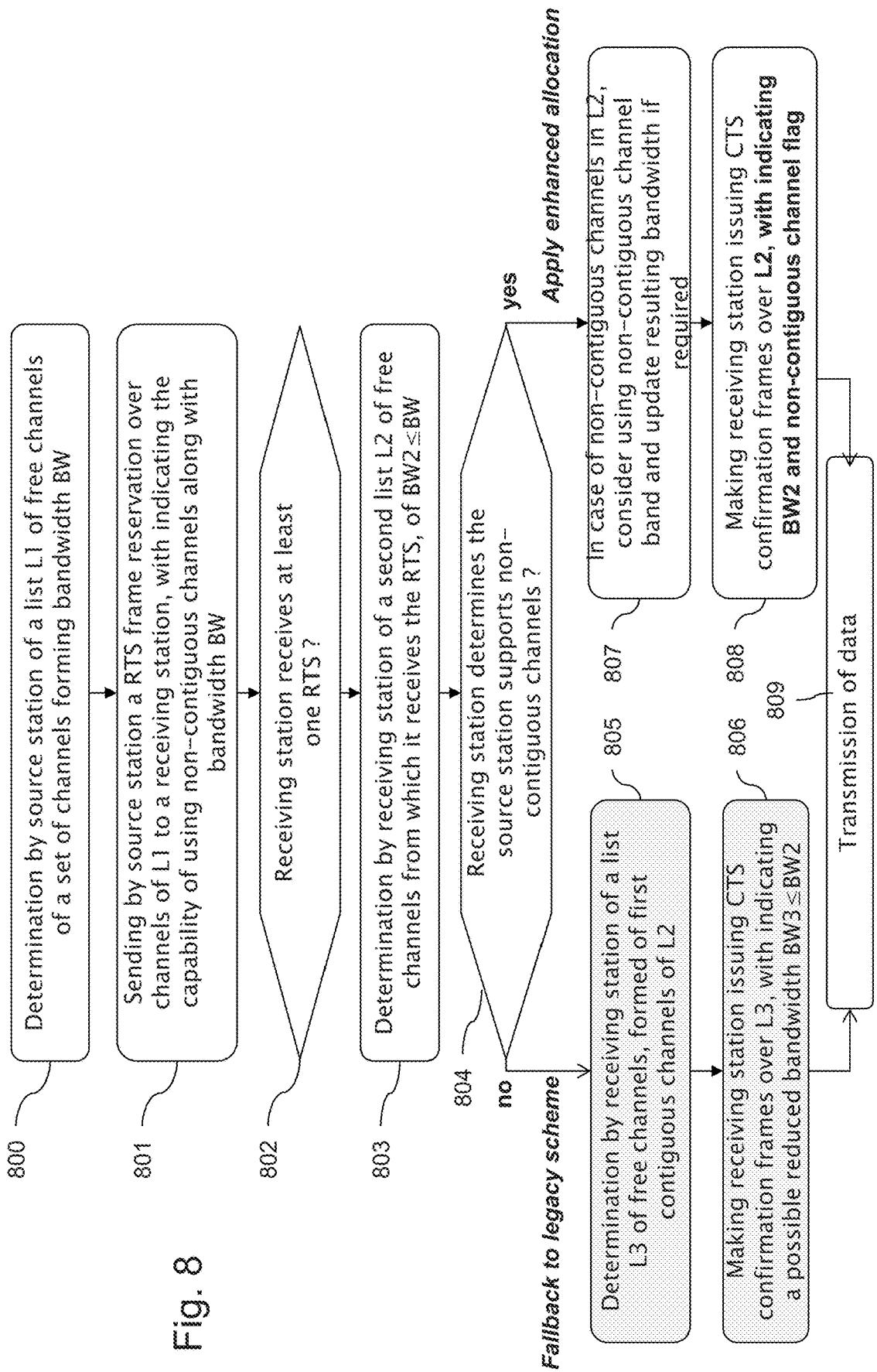
FIG. 8 illustrates, using a flowchart, general steps of an enhanced channel allocation method for multi-channel transmission to an 802.11ac wireless medium, that allows usage of non-contiguous sub-channels, in accordance with embodiments of the present invention.

FIG. 8 illustrates, using a flowchart, general steps of an embodiment of the present invention to enhance channel allocation for multi-channel transmission in an 802.11ac wireless medium.

Figure 9:
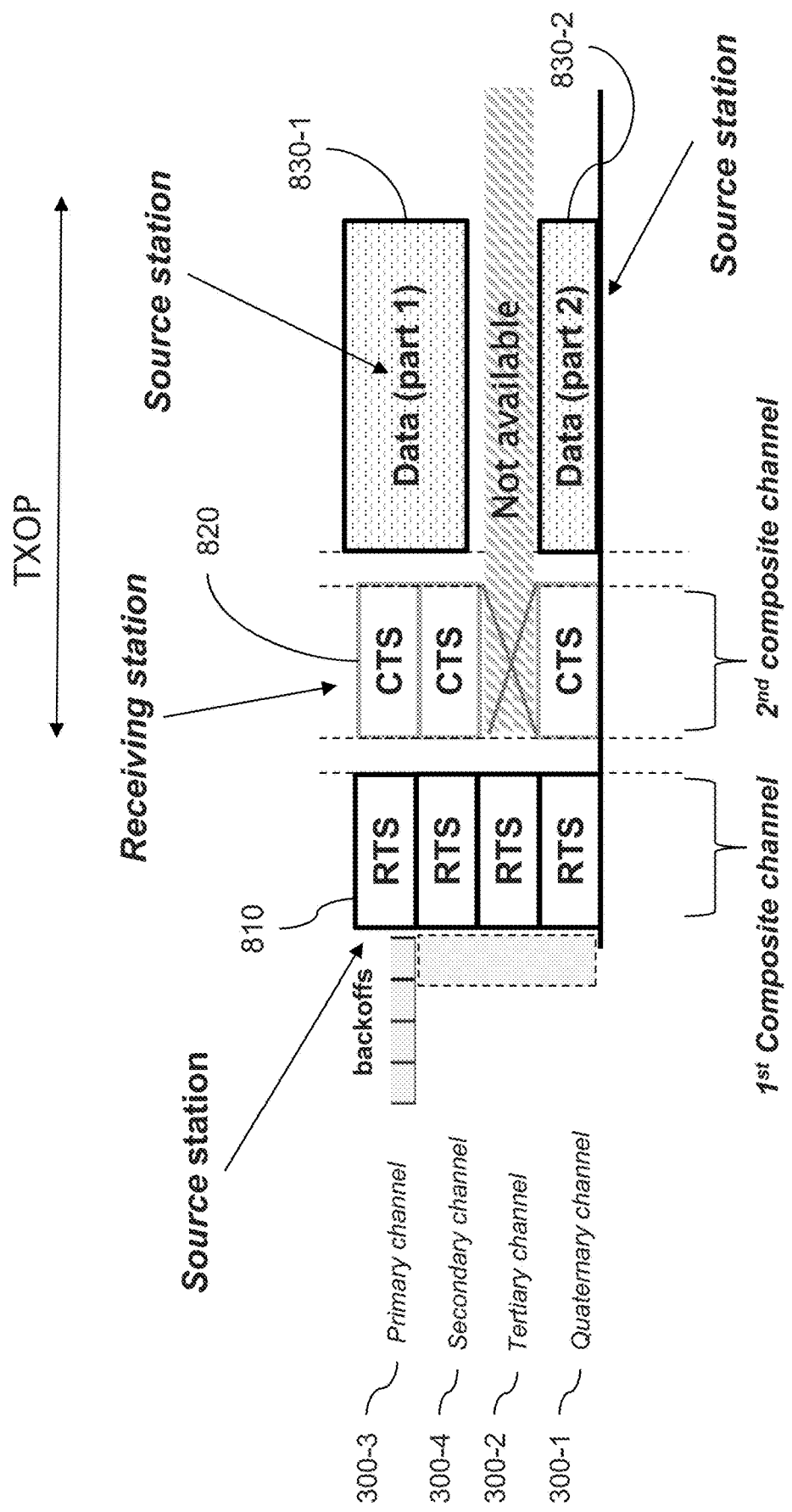
FIGS. 9 and 10 illustrate exemplary communication timelines illustrating embodiments of the invention.
Figure 10:
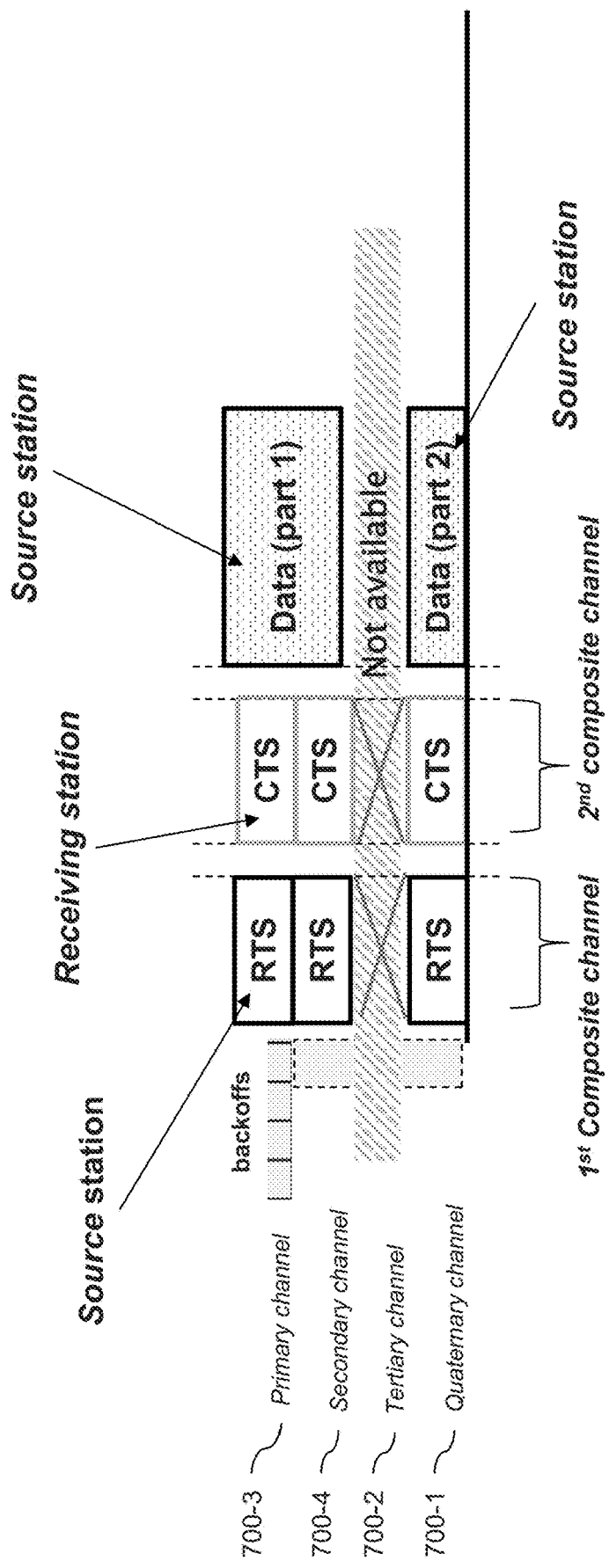

FIGS. 9 and 10 illustrates exemplary communication lines according to the invention. Although these examples show a WLAN system using a multi-channel including four contiguous sub-channels having a channel bandwidth of 20 MHz, the number of sub-channels or the channel bandwidth thereof may vary.

Also these examples use the standard RTS/CTS handshaking mechanism over the multiple channels according to 802.11ac. Of course, equivalent mechanisms may be used.

The method of FIG. 8 is implemented by two stations 600, one being considered as a source node having data to transmit to the other node, namely a destination or receiving node.

At step 800, based on techniques such as described in 802.11ac standard, i.e. energy detection, preamble detection and/or plural channel decoders, the source node is able to determine which of the communication 20 MHz sub-channels are idle for sending a corresponding RTS.

Let's consider the source node detects several sub-channels as idle and thus desires to reserve a composite channel L1 made of one or more of these available sub-channels.

At step 801, the source node sends a control or "medium access requesting" frame (RTS frame) to request reservation of the composite channel made of detected free sub-channels 300-1 to 300-4 (see FIGS. 9 and 10).

Figure 11:
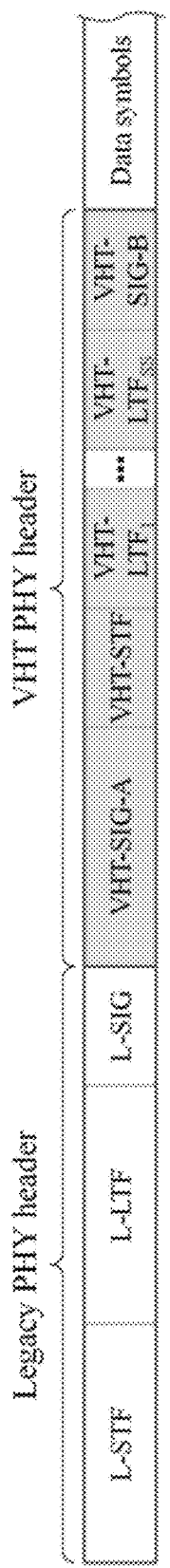
FIGS. 11 and 12 illustrate a typical 802.11ac frame format as known in the art, which is adapted to implement the invention according to some embodiments.
Figure 12:
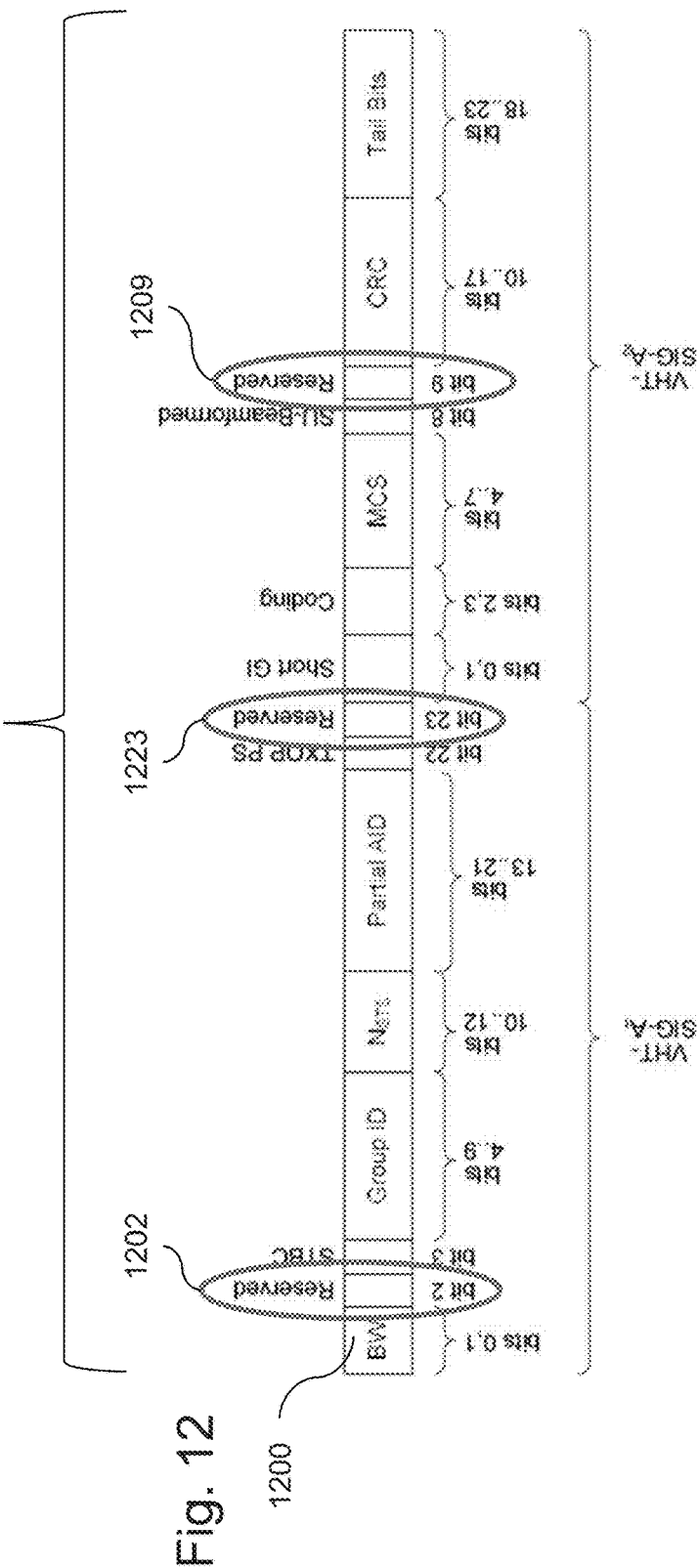

This frame is replicated on each 20 MHz sub-channel (300-*i*) forming the composite channel. According to the 802.11ac standard, the RTS frame includes bandwidth information to indicate which 802.11ac channel width is requested for data frame 830. This information is set in field 1200, called 'BW', of VHT-SIG-A1 portion of 802.11ac PLCP preamble according to 802.11ac protocol, as shown in FIGS. 11 and 12 discussed on below.

In the example of FIG. 9, all four sub-channels are sensed as idle and thus available for transmission. The source node thus duplicates the RTS frame intended for the primary (sub-)channel to the other three sub-channels. As a consequence, four RTS frames are sent, one on each available 20 MHz channel.

In embodiments, the source node is able to apply an 802.11ac fallback mechanism if one of the sub-channel is detected as busy, i.e. the source node turns to request 40 MHz or 20 MHz, including the primary 20 MHz channel.

In a variant, the source node doesn't apply the fallback scheme but emits the duplicated RTS in each idle sub-channel even if the idle sub-channels do not comply with a standardized contiguous 20 MHz or 40 MHz or 80 MHz 802.11ac channel width. An example is shown in FIG. 10 where the source node detects the tertiary channel as busy, meaning that the idle sub-channels form a non-contiguous composite channel within the operating band: the source node determines that energy in the tertiary channel is not below a CCA threshold, indicating this sub-channel is busy or reserved by another communication node.

In this example of FIG. 10, the bandwidth indication 1200 in the RTS frame keeps the authorized value (40 MHz, 80 MHz or 160 MHz) of whole targeted bandwidth, i.e. the contiguous bandwidth within the operating band that encompasses the requested non-contiguous composite channel. This approach keeps backward compatibility with current 802.11 standards.

According to the invention, the duplicated RTS frames include information to direct the manner by which the source node is to provide data frames inside the granted TXOP, i.e. using only sub-channels that are contiguous or adjacent within the operating band, or not. Such information regards a capability indication of the source node to support non-contiguous channels within the operating band. As a consequence, according to the invention, the medium access requesting frames (RTS frames) includes a flag signalling the source node supports transmission over non-contiguous sub-channels within the operating band, i.e. reservation of non-contiguous sub-channels.

This information (signalling flag) may be located in a header portion of the RTS control frame, where the header portions otherwise conforms to IEEE 802.11ac standard. For example, the information may be included in a reserved field of a header portion (as for instance bits 1202, 1223 or 1209 of the VHT PHY header as described in FIGS. 11 and 12 below).

This signalling flag will help the receiving node to optimize use of available sub-channels from among the requested sub-channels.

Indeed, an 802.11ac-compliant node having one and a single antenna cannot use channels that are not contiguous or successive within the operating band, according to 802.11ac standard. Recently, paper contribution to 802.11ax have addressed the capability to communicate over a set of channels containing busy channels. The document IEEE 802.11-15/0035r1, entitled "Scalable Channel Utilization Scheme", proposes a scalable channel utilization scheme to utilize as many channels as possible, even non-contiguous within the operating band, by turning on/off part of the OFDM tones. The OFDM Tones corresponding to a detected busy channel can be turned off so as to cause no interference with the ongoing transmission. For instance, the D(k) component of the following expression (expressing the OFDM signal) can be set to zero:

$$d(n) = \frac{1}{N}\sum_{k=0}^{N-1} D(k)\exp\left(\frac{j \cdot 2\pi \cdot k \cdot n}{N}\right), n = 0, 1, K\ N-1$$

where N is the FFT size.

Using the above-mentioned signalling flag, the present invention aims at supporting such capability so that the nodes may discover this capability of talking in non-contiguous channels of the operating band and may negotiate with each other a medium reservation including sub-bands that are conventionally (i.e. according to 802.11ac) "not reachable" because not contiguous within the operating band.

The following of the process takes place if the receiving node (i.e. the addressee as specified in the RTS frames) receives at least one of the RTS frames (test 802).

Upon receiving such RTS frame or frames, the receiving node determines which of the requested sub-channels (i.e. for which a RTS frame has been received) are available (i.e. sensed as idle) using conventional sensing means. These available sub-channels form a list L2. A goal of such determination is for the receiving node to be able to build or determine which composite channel is actually available for the source node, i.e. for which sub-channels forming this obtained composite channel the receiving node has to send medium access requesting frames, for instance CTS frames.

To do so, the receiving node, implementing the invention, needs to know whether or not the source device supports transmission over non-contiguous sub-channels within the operating bans (in which case sub-channels that are not successive in the operating band could be actually reserved). This is done through step 804 in which the receiving node analyses the received RTS frame or frames in order to retrieve and analyse the value of the signalling flag as introduced above.

In case no signalling flag is set in the RTS frames (output "no" at test 804), the conventional or "legacy" approach is applied through steps 805-806. In case a signalling flag in the received RTS frames signals the source node supports transmission over non-contiguous channels within the operating band (output "yes" at step 804), an enhanced channel reservation according to the invention may be implemented through steps 807-808.

If the receiving node determines that the source node doesn't support non-contiguous channel usage, the source node is considered as a legacy and the outcome of test 804 results in applying legacy allocation scheme at steps 805 and 806.

According to the 802.11ac standard, the list L2 determined by the receiving node is based on the determination of the set of sub-channels in which RTS control frames were received: list L2 can include secondary channels 300-1, 300-2, 300-4 only if it also includes primary channel 300-3 as in regards of FIG. 5.

In the examples of FIGS. 9 and 10, it means that quaternary channel 300-1 will not be kept for reservation and considered for communication because it is isolated due to the non-availability of tertiary channel 300-2. Indeed, the combination of sub-channel 300-3, 300-4 and 300-1 doesn't fit in an allowed 802.11ac bandwidth indication (20, 40, 80 or 160 MHz). Thus, at step 805, the reserved composite channel L3 is determined from sub-channel list L2, wherein L3 contains the subset of contiguous sub-channels of L2 that meets a bandwidth allowed in 802.11ac bonding scheme and that includes primary 20 MHz channel 300-3.

At step 806 in response to the RTS frames received, the receiving node transmits duplicated CTS response frames to the source node over each sub-channel forming the determined contiguous composite channel L3. The CTS frames indicate the resulting bandwidth according to 802.11ac legacy scheme. To be noted that, in order to keep backward compatibility (i.e. with 802.11a/b/g/n), the CTS frames follows the convention format without any indication of the support of non-contiguous channels.

If the receiving node has successfully received all the RTS frames (for instance the four RTS frames from the entire 80 MHz bandwidth shown in FIG. 9), a total of four CTS frames is transmitted to cover the 80 MHz channel bandwidth. Therefore, according to 802.11ac standard, the whole 80 MHz composite channel is reserved to the source node for it to send its data to the receiving node.

If the receiving node has successfully received RTS frames only for a part of the requested bandwidth (for instance for a part of the sub-channels forming the 80 MHz bandwidth as shown in FIG. 9 because tertiary channel 300-2 is busy in the standpoint of the receiving node), the receiving station will not transmit a CTS frame on quaternary channel 300-1, but it will fallback to 802.11ac legacy scheme by issuing conventional CTS frames on 20 MHz channels 300-3 and 300-4 (40 MHz width). In other words, CTS frames are sent only for the composite channel L3 corresponding to a bandwidth allowed in 802.11ac bonding scheme. As a consequence, the resulting bandwidth specified in the CTS frames is reduced compared to the original bandwidth BW specified in the received RTS frames.

Specific to the invention are steps 807 and 808 in case the receiving node determines that a signalling flag in the received RTS frames signals the source node supports transmission over non-contiguous channels within the operating band.

The determination step for reserved composite channel L3 is modified compared to the legacy scheme described with reference to step 805. At step 807, the receiving node considers all available sub-channels listed in L2 (from among the original requested bandwidth) as potential sub-channels for the further transmission.

Three main cases may occur regarding the available sub-channels of L2 compared to the sub-channels of the requested composite channel L1:
  in a first case, list L2 includes free sub-channels that are not contiguous within the operating band;
  in a second case, list L2 includes contiguous free sub-channels within the operating band, which contiguous sub-channels do not form an authorized channel width allowed by 802.11 channel bonding scheme (i.e. do not correspond to predefined 20 MHz, 40 MHz or 80 MHz composite channel configurations that include the primary sub-channel). This is for instance the case in example 520 of FIG. 5, wherein 60 MHz band is available but not considered by 802.11ac standard;
  in the third and last case, list L2 includes contiguous free sub-channels that form an authorized channel width allowed by 802.11 channel bonding scheme. The resulting bandwidth is thus compliant to the legacy scheme. This case also covers the situation in which all requested sub-channels are free. This case may be indifferently processed through the legacy allocation scheme of steps 805 and 806 or through the enhanced allocation scheme of steps 807 and 808.

At step 807, as the receiving node has detected non-contiguous free channels (first case above) and determined that the source node does support their usage (i.e. transmission over non-contiguous channels within the operating band), it considers using all the non-contiguous sub-channels belonging to the requested composite channel of bandwidth BW.

The bandwidth indication, BW2, to be specified in the CTS response may be restricted to the narrowest allowed 802.11ac channel width (to ensure backward compatibility) that encompasses all these non-contiguous sub-channels. In a variant, it is kept identical to the bandwidth BW specified in the received RTS frames.

Still at step 807 but for the second case, all free sub-channels are contiguous within the operating band but do not comply with any channel width allowed by the 802.11ac standard (20, 40, 80 or 160 MHz). Thus, there are two possibilities.

First, the channel width, BW2, to be indicated in the CTS responses is kept as the original BW specified in the RTS frames received on the detected free channels.

Second, BW2 is reduced to the 802.11ac bandwidth value (20, 40, 80 or 160 MHz) which includes all the free contiguous sub-channels. As a result, BW2 is less or equal than the requested bandwidth BW. In other words, BW2 is the 802.11ac standardized value just greater or equal to the bandwidth formed by the detected free sub-channels.

In the example of FIG. 9 or 10, as BW equals 80 MHz and only one sub-channel (300-2) is busy among the four requested 20 MHz channels, BW2 also equals 80 MHz.

Still at step 807 but for the third and last case, all the detected free sub-channels are considered and the bandwidth they are forming is used as BW2 to be specified in the CTS frames. Note that if all the requested sub-channels are detected as idle, BW2 equals BW as requested by the source node.

Next, at step 808, the receiving node generates a CTS frame that includes bandwidth BW2, and duplicates it on each channel of list L2 (from which channels RTS frames were received). Furthermore, the duplicated CTS frames include an indication of the support of non-contiguous channels within the operating band, i.e. include the same signalling flag as described above. This flag will help the source node to quickly know (as soon as the first CTS is received) whether or not the receiving node supports transmission over non-contiguous channels within the operating band. This is because the source node may reduce its internal processing (for instance listening on various sub-channels, powering of antenna) in case the receiving node does not support non-contiguous channel usage.

Preferably, the CTS frames are in accordance to 802.11 standards to ensure backward compatibility.

By receiving these CTS frames, the source node is allowed to configure itself for operating among bandwidth BW2 and knows if non-contiguous channels are reserved. In the same way as done at step 803, the source node can easily determine which channels are reserved as these channels correspond to the ones on which a CTS frame is received.

In the approach of the invention, if the receiving node has successfully received RTS frames only from part of the 80 MHz bandwidth as shown in FIG. 9 or 10 (tertiary channel 300-2 being busy in the standpoint of the receiving node), the receiving node can transmit less CTS frames (than the RTS frames sent) to cover the idle channels among the 80 MHz channel bandwidth. In the example of the Figure, there are three CTS frames that are sent because the source node has indicated its capability of transmitting over non-contiguous channels, and the receiving node is able to detect such capability, also to detect busy sub-channels (here tertiary channel 300-2), and to emit a CTS response replicated on each of the detected idle sub-channels.

As a consequence, the source node is allowed to use a 60 MHz bandwidth channel for instance in non-contiguous form (made of 830-1 and 830-2) for sending its data to the receiving node. This sharply contrasts to the legacy approach in which only a 40 MHz transmission would be obtained by an 802.11ac-compliant source node.

Next to step 806 and 808, the CTS frames are received by the source node acting that a TXOP is granted to the source node. The latter is now aware of the actual reserved bandwidth and starts transmitting data to the receiving node sending DATA frames 830-1, 830-2 over the reserved composite channel. This is step 809.

In particular, the DATA frames can also include the signalling flag as described above.

For a hardware point of view, transmitting data over channels not contiguous within the operating band implied duplicating the front-end segments per station for independent receive frequency filtering and signal forming (front-end segments are composed of intermediate frequency filtering and up/down conversion chains, including digital to analog converter and analog to digital converter (ADC) respectively).

When using channels not contiguous within the operating band (first case mentioned above), most used transmission systems comprise as many front-end segments as there are separate (i.e. non-contiguous) blocks of sub-channels. It means that when the used sub-channels are all contiguous, there is only need for one front-end segment; and when the used sub-channels are non-contiguous within the operating band, there are at least two front-end segments.

Document IEEE 802.11-15/0035r1 "Scalable Channel Utilization Scheme" provides a scalable channel utilization scheme to communicate over non-contiguous channels using a single antenna and a single corresponding front-end segment. The scalable channel utilization scheme utilizes as many channels as possible by turning on/off part of the OFDM tones among a band of channels. To be more precise, the D(k) component of the following expression (expressing the OFDM signal) can be set to zero for each sub-channel "k" sensed as busy:

$$d(n) = \frac{1}{N}\sum_{k=0}^{N-1} D(k)\exp\left(\frac{j \cdot 2\pi \cdot k \cdot n}{N}\right), n = 0, 1, K\ N - 1$$

where N is the FFT size.

This technical approach makes it possible for the skilled man to implement transmission over non-contiguous channels using only one antenna.

The above has clearly shown that in a context of dense channel usage where the chances of finding an idle contiguous channel of 80 MHz bandwidth (according but not limited to the figure) are very limited, allowing the reservation of all free, even non-contiguous, requested sub-channels according to the invention substantially improved usage of the available bandwidth.

To be noted the node's behaviour when legacy nodes are involved.

In particular, a 802.11 legacy node that is receiving one or more RTS frames (not addressed to it) determines the TXOP duration (included in a duration field in the MAC header of RTS frame for 802.11ac/n, or computed from rate and length indicated in the PHY header of RTS frame for older 802.11 standards) and waits until the end of this period before performing clear channel assessment (CCA).

As consequence, the wireless medium is protected against access by legacy nodes for at least the duration of data transmission 830.

Also, a receiving node that implements the invention may receive RTS frames from a legacy 802.11ac/n source node. In that case, the receiving node of the invention may determine that the RTS frames doesn't contain the above-mentioned signalling flag (or more generally a capability indication of supporting non-contiguous channels in the operating band) and then consider the source node as a legacy node.

To ensure backward compatibility of the RTS, CTS and DATA frames with older 802.11 standards (i.e. to ensure the old legacy nodes are able to read and process these frames), the signalling flag is preferably set in a part of the frames that does not impact the legacy nodes that do implement the invention.

For instance, the signalling flag is included in a header of the RTS or CTS or DATA frames.

It is now described with reference to FIGS. 11 and 12 which show possible locations for the signalling "non-contiguous channel usage" flag inside an 802.11 frame, in particular using one of the following bits:

bit 2 of VHT-SIG-A1 header portion according to 802.11ac standard;

bit 23 of VHT-SIG-A1 header portion according to 802.11ac standard;

bit 9 of VHT-SIG-A2 header portion according to 802.11ac standard.

The 802.11ac frame format is shown in FIG. 11 and starts, as expected, with a preamble or header.

The first three fields are L-STF (Short Training Field), L-LTF (Long Training Field) and L-SIG (Signal) well known by one skilled in the art when considering 802.11ac standard.

The L-STF and L-LTF fields contain information that allows the device to detect the wireless signal, perform frequency offset estimation, timing synchronization, etc. The 'L-' stands for 'legacy' and the details of the sequences used in these fields for the 20 MHz signals are the same as the legacy 802.11a and 802.11n preamble fields which allows for all 802.11 devices to synchronize with the wireless signal.

In addition, the L-SIG field includes information regarding the length of the rest of the frame. This means that all devices including the legacy devices will know that a frame of a given length is being transmitted.

The next fields in the frame, the names of which start with "VHT", are specific to 802.11ac ("VHT" means 802.11ac since it stands for "Very High Throughput"). The VHT-SIG-A field contains two OFDM symbols, namely VHT-SIG-A1 and VHT-SIG-A2.

The first symbol is modulated using BPSK, so that any 802.11n device receiving it will think that the frame is in accordance with the 802.11a frame format.

Important information is contained in the bits of these two symbols such as bandwidth mode, MCS (Modulation and Coding Scheme) for the single user case, number of space time streams, etc.

The legacy fields and the two VHT-SIG-A fields are duplicated over each 20 MHz of the bandwidth when 802.11ac (including the invention) is implemented.

After the VHT-SIG-A section, the VHT-STF field is sent. The primary function of the VHT-STF field is to improve automatic gain control estimation in a MIMO transmission.

The next 1 to 8 fields of the packet are the VHT-LTF fields, one per spatial stream (up to SS=8 usually) to be used for transmission. VHT-LTF fields allow the receiving node to calculate the multipath characteristics of the channel and apply them to the MIMO algorithm.

The VHT-SIG-B field is the last field in the preamble/header before the data field is sent. VHT-SIG-B is BPSK modulated and provides information on the length of the useful data in the packet and in the case of MU-MIMO provides the MCS (The MCS for single user case is transmitted in VHT-SIG-A).

Following the preamble/header, data symbols are transmitted.

FIG. 12 shows the VHT-SIG-A section for the single user case with the number of bits used for each of its fields.

The bandwidth field "BW" is made of two bits used to indicate the composite channel bandwidth: 0 for 20 MHz, 1 for 40 MHz, 2 for 80 MHz, and 3 for 160 MHz.

For single-user frame transmission, a partial association ID (partial AID) field is an abbreviated indication of the intended addressee of the frame, which thus enables any receiving node to enter power save mode when it ascertains that it is not the intended recipient. For transmissions to an AP (access point), the partial AID is the last nine bits of the BSSID. For a receiving node, the partial AID is an identifier that combines the association ID and the BSSID of its serving AP.

A Group identifier (group ID) field was introduced in the VHT-SIG-A field. The downlink MU-MIMO transmissions can be organized in the form of MU-TXOP to facilitate the sharing of TXOP where AP can perform simultaneous transmissions to multiple receiving nodes by using the group ID. Nodes can determine whether they are part of the multiple-user transmission or not.

According to the invention, there is a need to include the signalling flag, i.e. an indication of using non-contiguous channels for a current transmission (both in RTS/CTS frame handshake and DATA transmission) inside the 802.11 header frame. As the 802.11ac transmits an indication of the bandwidth in the Bandwidth field, embodiments provides that the signalling flag is included in a reserved field of the VHT-SIG-A header of the 802.11 frame.

As a result, legacy 802.11a and 802.11n nodes will not decode such indication.

In addition, if located in a reserved field, a legacy 802.11ac node may not consider the non-contiguous channels signalling flag and ignore this capability.

Preferably, bit 2 of VHT-SIG-A1 is used (1202 in regards to FIG. 12) because it is the closest free bit to the Bandwidth field BW. But, other locations, such as for example 1223 (bit 23 of VHT-SIG-A1) and 1209 (bit 9 of VHT-SIG-A2) are possible variants.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of communicating data over a composite channel made of a plurality of frequency sub-channels in a wireless network, the method comprising:
    transmitting a preamble duplicated over a set of at least two sub-channels; and
    transmitting data over the at least two sub-channels of the set of sub-channels,
    wherein the duplicated preamble includes 3 bits capable of indicating a bandwidth of the composite channel and that the sub-channels of the set of sub-channels are non-contiguous.

2. The method of claim 1, wherein the 3 bits included in the duplicated preamble are consecutive.

3. The method of claim 1, wherein the 3 bits includes:
    a 2-bits bandwidth field capable of indicating the bandwidth; and
    a 1-bit signaling flag capable of indicating the use of non-contiguous sub-channels.

4. The method of claim 1, wherein the bandwidth field indicates one of the following bandwidths: 20 MHz, 40 MHz, 80 MHz or 160 MHz.

5. The method of claim 1, wherein the 3 bits are located in a signal A, SIG-A, field of an IEEE 802.11 frame.

6. The method of claim 1, wherein the data is transmitted in a physical Protocol Data Unit over the set of sub-channels.

7. A non-transitory computer-readable storage medium storing instructions that, when executed by a computing device, perform a process comprising:
    transmitting a preamble duplicated over a set of at least two sub-channels; and
    transmitting data over the at least two sub-channels of the set of sub-channels,
    wherein the duplicated preamble includes 3 bits capable of indicating a bandwidth of the composite channel and that the sub-channels of the set of sub-channels are non-contiguous.

8. A device of communicating data over a composite channel made of a plurality of frequency sub-channels in a wireless network, the device comprising a processor configured for:
    transmitting a preamble duplicated over a set of at least two sub-channels; and
    transmitting data over the at least two sub-channels of the set of sub-channels,
    wherein the duplicated preamble includes 3 bits capable of indicating a bandwidth of the composite channel and that the sub-channels of the set of sub-channels are non-contiguous.

* * * * *